United States Patent [19]
Naito

[11] Patent Number: 4,887,689
[45] Date of Patent: Dec. 19, 1989

[54] DRIVING FORCE DISTRIBUTION CONTROL SYSTEM FOR 4WD VEHICLE

[75] Inventor: Genpei Naito, Yokosuka, Japan

[73] Assignee: Nissan Motor Co., Ltd., Yokohama, Japan

[21] Appl. No.: 277,746

[22] Filed: Nov. 30, 1988

[30] Foreign Application Priority Data

Nov. 30, 1987 [JP] Japan .................. 62-302473

[51] Int. Cl.$^4$ .......................................... B60K 17/34
[52] U.S. Cl. ................................. 180/233; 364/424.1
[58] Field of Search ............. 180/233, 247, 248, 249, 180/250, 197; 364/424.1, 426.03

[56] References Cited

U.S. PATENT DOCUMENTS

| | | | |
|---|---|---|---|
| 4,466,502 | 8/1984 | Sakai | 180/247 |
| 4,481,877 | 11/1984 | Takano et al. | 180/233 |
| 4,484,653 | 11/1984 | Horikoshi et al. | 180/233 |
| 4,558,414 | 12/1985 | Sakakiyama | 364/424.1 |
| 4,562,541 | 12/1985 | Sakakiyama | 364/424.1 |
| 4,583,627 | 4/1986 | Kumura et al. | 192/0.076 |
| 4,605,087 | 8/1986 | Ashauer et al. | 180/248 |
| 4,613,008 | 9/1986 | Hiraiwa et al. | 180/247 |
| 4,664,216 | 5/1987 | Kodama et al. | 180/233 |
| 4,678,056 | 7/1987 | Kobari et al. | 180/247 |
| 4,715,466 | 12/1987 | Ishii et al. | 180/233 |
| 4,754,834 | 7/1988 | Ozaki et al. | 180/233 |
| 4,757,870 | 7/1988 | Torii et al. | 180/233 |
| 4,773,500 | 9/1988 | Naito et al. | 180/233 |
| 4,776,424 | 10/1988 | Naito | 180/233 |

FOREIGN PATENT DOCUMENTS

| | | | |
|---|---|---|---|
| 64669 | 11/1982 | European Pat. Off. | 180/197 |
| 182312 | 5/1986 | European Pat. Off. | 180/233 |
| 189176 | 7/1986 | European Pat. Off. | 180/233 |
| 3345470 | 7/1984 | Fed. Rep. of Germany . | |
| 3434395 | 5/1985 | Fed. Rep. of Germany . | |
| 58-12827 | 1/1983 | Japan | 180/233 |
| 58-56922 | 4/1983 | Japan . | |
| 59-160630 | 9/1984 | Japan | 180/233 |
| 61-67629 | 4/1986 | Japan . | |
| 61-157437 | 7/1986 | Japan . | |
| 61-157438 | 7/1986 | Japan . | |
| 61-193931 | 8/1986 | Japan | 180/233 |
| 61-244628 | 10/1986 | Japan | 180/233 |
| 882786 | 3/1980 | U.S.S.R. . | |
| 2104178 | 3/1983 | United Kingdom . | |
| 2118666 | 11/1983 | United Kingdom . | |
| 2167718 | 6/1986 | United Kingdom . | |
| 2167824 | 6/1986 | United Kingdom . | |

Primary Examiner—John A. Pekar
Attorney, Agent, or Firm—Foley & Lardner, Schwartz, Jeffery, Schwaab, Mack, Blumenthal & Evans

[57] ABSTRACT

A driving force distribution control system for a 4WD vehicle includes a transfer clutch for continuously varying a front wheel driving force transmitted to front wheels, a sensor group for sensing conditions of the vehicle to determine a vehicle speed, and a front and rear wheel speed difference obtained by subtracting a front wheel speed from a rear wheel speed, and a control unit for controlling the front wheel driving force substantially continuously by controlling the engagement force of the transfer clutch. The control unit includes a first calculating section for calculating a slip dependent clutch engagement force which increases as the absolute value of the front and rear wheel speed difference increases, a second calculating section for calculating a vehicle speed dependent clutch engagement force which increases as the vehicle speed increases, and a selecting section for determining a final desired transfer clutch engagement force by selecting the greater of the results of the first and second calculating sections.

10 Claims, 8 Drawing Sheets

DRIVING FORCE DISTRIBUTION CONTROL SYSTEM FOR 4WD VEHICLE7

REFERENCES TO RELATED APPLICATIONS

The following, commonly assigned, U.S. Applications relate to driving force distribution control systems similar to a control system of the present invention. (1) Serial No. 830,015; (2) Serial No. 820,055, matured to U.S.P 4,754,834; (3) Serial No. 906,309, matured to U.S.P 4,773,500; (4) Serial No. 893,245, matured to U.S.P 4,776,424 Serial No. 127,319; (6) Serial No. 254,626, filed Oct. 7, 1988 now Pat. No. 4,846,298 based on Japanese Application No. 62-259037, (7) Serial No. 254,875 filed October 7, 1988 based on Japanese Applications Nos. 62-254218 and 62-2,254219. (8) Serial No. 255,820, filed Oct. 11, 1988 based on Japanese Application No. 62-255745, (9) Serial No. 277,377 filed November 29, 1988, based on Japanese Application 62-302472 (10) Serial No. 255,939, filed Oct. 11, 1988 based on Japanese Application No. 62255746, Especially, the ninth application Ser No. 277,377 based on Japanese Application No. 62302472 is closely related.

BACKGROUND OF THE INVENTION

The present invention relates to a driving force distribution control system for controlling a transfer of a 4WD system for distributing a driving force of an engine between front and rear wheels.

One conventional example is shown in Japanese patent provisional publication no. 61-157437. A driving force distribution control system of this conventional example is arranged to calculate a front and rear wheel speed difference representing a drive wheel slip, from sensor signals, and to increases an engagement force of a transfer clutch as the front and rear wheel speed difference increases. Thus, this system can restrain the drive wheel slip by increasing the tendency to 4WD with increase of the drive wheel slip.

However, this conventional control system is arranged to increase the clutch engagement force with increase in the front and rear wheel speed difference, and control constants are set so that the steer characteristic of the vehicle remains neutral steer over an entire vehicle speed range from low and medium speeds to high speeds. Therefore, this conventional system is still problematical in the following points.

(i) Even in a high speed straight ahead operation, the transfer clutch is engaged with a delay after occurrence of the front and rear wheel speed difference. Therefore, the stability is poor especially in an operation for lane change, and to minute disturbances.

(ii) The steer characteristic is always a neutral-steer characteristic whereas a weak understeer characteristic is desired in a high speed turning operation with acceleration. Therefore, the directional control is difficult in a high speed turning operation.

(iii) If the driving force distribution control system is adjusted so as to meet the above-mentioned problems (i) and (ii) in the high speed driving, then the stability at low and medium speeds is deteriorated. It is difficult or impossible to meet both the requirement in the low and medium speed range and the requirement in the high speed range.

SUMMARY OF THE INVENTION

It is therefore an object of the present invention to provide a driving force distribution control system capable of satisfying requirements in various operating conditions.

According to the present invention, a driving force distribution control system for a vehicle comprises clutch means 1, sensing means 2 and controlling means, as schematically shown in FIG. 1.

The clutch means 1 is provided in a drive system of the vehicle for varying a driving force transmitted therethrough to vary a driving force distribution between front and rear wheels in response to a control signal. In an illustrated embodiment, the clutch means comprises a transfer clutch which is provided in a drive path for transmitting a driving force to the front wheels, and which is arranged to vary the driving force transmitted to the front wheels substantially continuously by varying a clutch engagement force.

The sensing means 2 comprises first detecting means 201 for determining a front and rear wheel speed difference by sensing one or more conditions of the vehicle, and second detecting means 202 for determining a vehicle speed of the vehicle.

The controlling means 3 is means for controlling the clutch engagement force of the clutch means 1 to control the driving force distribution by producing the control signal. The controlling means 3 comprises first calculating means 301, second calculating means 302 and selecting means 303 for maximum selection. The first calculating means 301 is connected with the first detecting means 201, and arranged to determine a first clutch engagement force magnitude (Tx or Tneg shown in FIG. 7) in accordance with the front and rear wheel speed difference. The second calculating means 302 is connected with the second detecting means 202, and arranged to determine a second clutch engagement force magnitude (Tv shown in FIG. 7) in accordance with only the vehicle speed. The selecting means 303 is connected with the first and second calculating means 301 and 302, and arranged to determine a desired clutch engagement force magnitude (T* shown in FIG. 7) which is equal to the first clutch engagement force magnitude when the first magnitude is equal to or greater than the second magnitude, and which is equal to the second clutch engagement force magnitude when the second magnitude is greater than the first magnitude.

In a low or medium vehicle speed operation with the vehicle speed being held constant or being increased or being decreased, the selecting means 303 selects the first clutch engagement force magnitude based on the front and rear wheel speed difference. Therefore, the control system of the invention can provide a superior cornering ability during a constant speed operation or during acceleration, and provide a superior stability during deceleration.

At high speeds, the selecting means 303 compares the first clutch engagement force magnitude based on the front and rear wheel speed difference, and the second clutch engagement force magnitude based on the vehicle speed, and selects the second magnitude based on the vehicle speed when the front and rear wheel speed difference is small and the vehicle speed is high. In a high speed straight ahead operation, therefore, the control system can increase the clutch engagement force before occurrence of the front and rear wheel speed difference, so that the vehicle stability is improved. In a high speed turning operation with acceleration, the control system provides a weak understeer characteristic by controlling the clutch engagement force in accordance with the vehicle speed. Therefore, the driver can easily control the direction of the vehicle even in the high speed turning operation.

DETAILED DESCRIPTION OF THE INVENTION

One embodiment of the present invention is shown in FIGS. 2-13. A driving force (or driving torque) distribution control system of this embodiment is mounted on a four wheel drive vehicle based on a rear wheel drive system.

Figure 1:
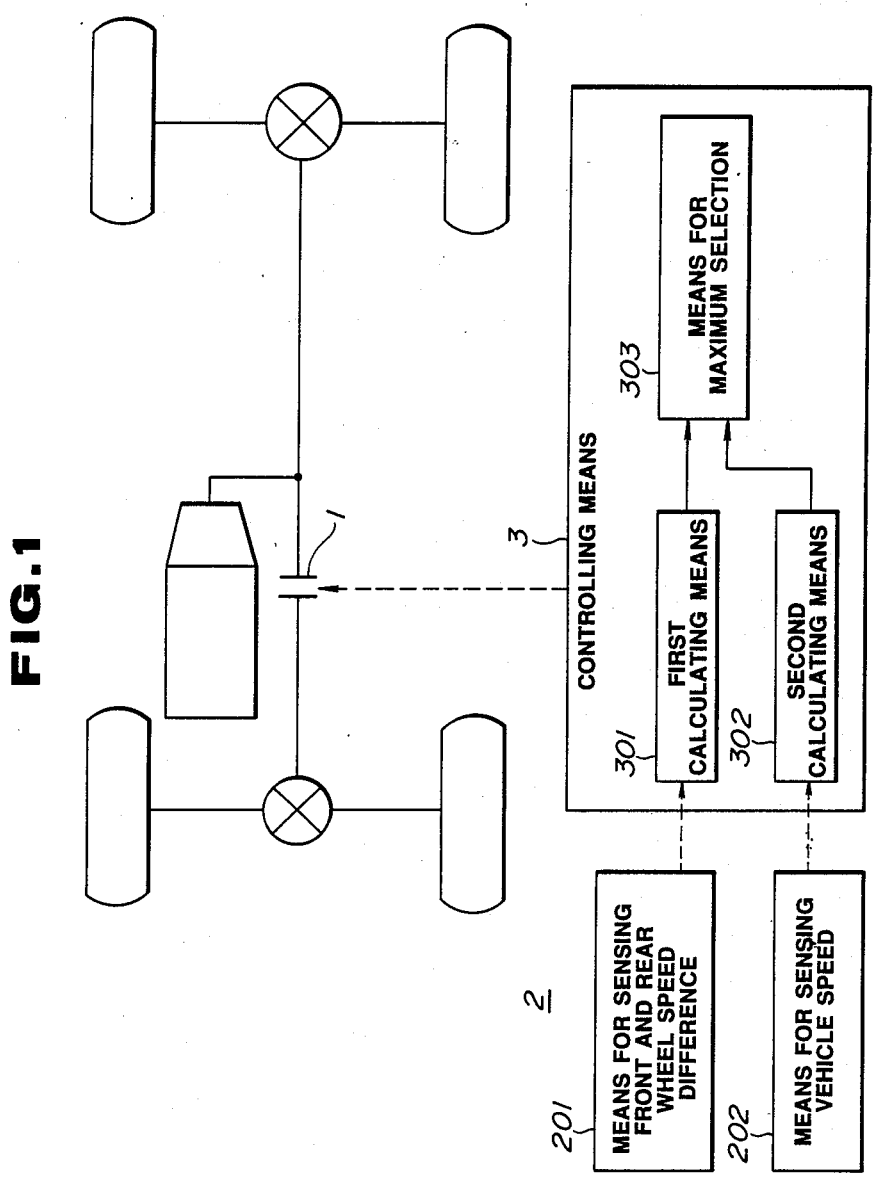
FIG. 1 is a schematic view for showing a basic arrangement of a driving force distribution control system according to the present invention.
Figure 2:
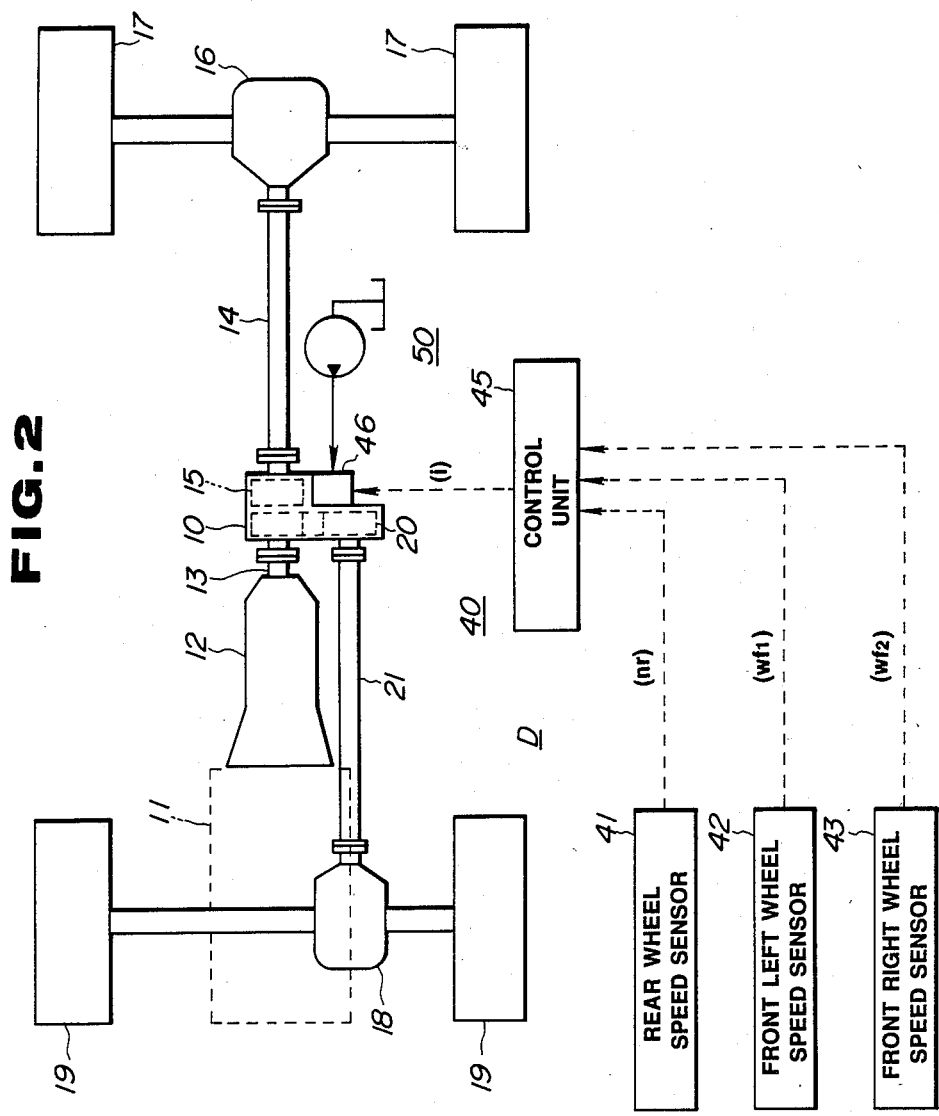
FIG. 2 is a schematic view of a four wheel drive vehicle equipped with a driving force distribution control system of one embodiment of the present invention.

As shown in FIG. 2, a four wheel drive vehicle employed in this embodiment includes a transfer 10, an engine 11, a transmission 12, a transfer input shaft 13, a rear wheel drive shaft 14, a transfer clutch 15 which, in this embodiment, is a multiple disc friction clutch, a rear differential 16, rear wheels 17, front differential 18, front wheels 19, a gear train 20, and a front wheel drive shaft 21.

The multiple disc friction type transfer clutch 15 is disposed between the transfer input shaft 13 and the front wheel drive shaft 21. On the other hand, the transfer input shaft 13 is directly connected with the rear wheel drive shaft 14. Therefore, the driving force of the engine 11 is always transmitted to the rear wheels 17. The transfer clutch 15 is capable of continuously varying the driving force transmitted to the front wheels 19.

Figure 3:
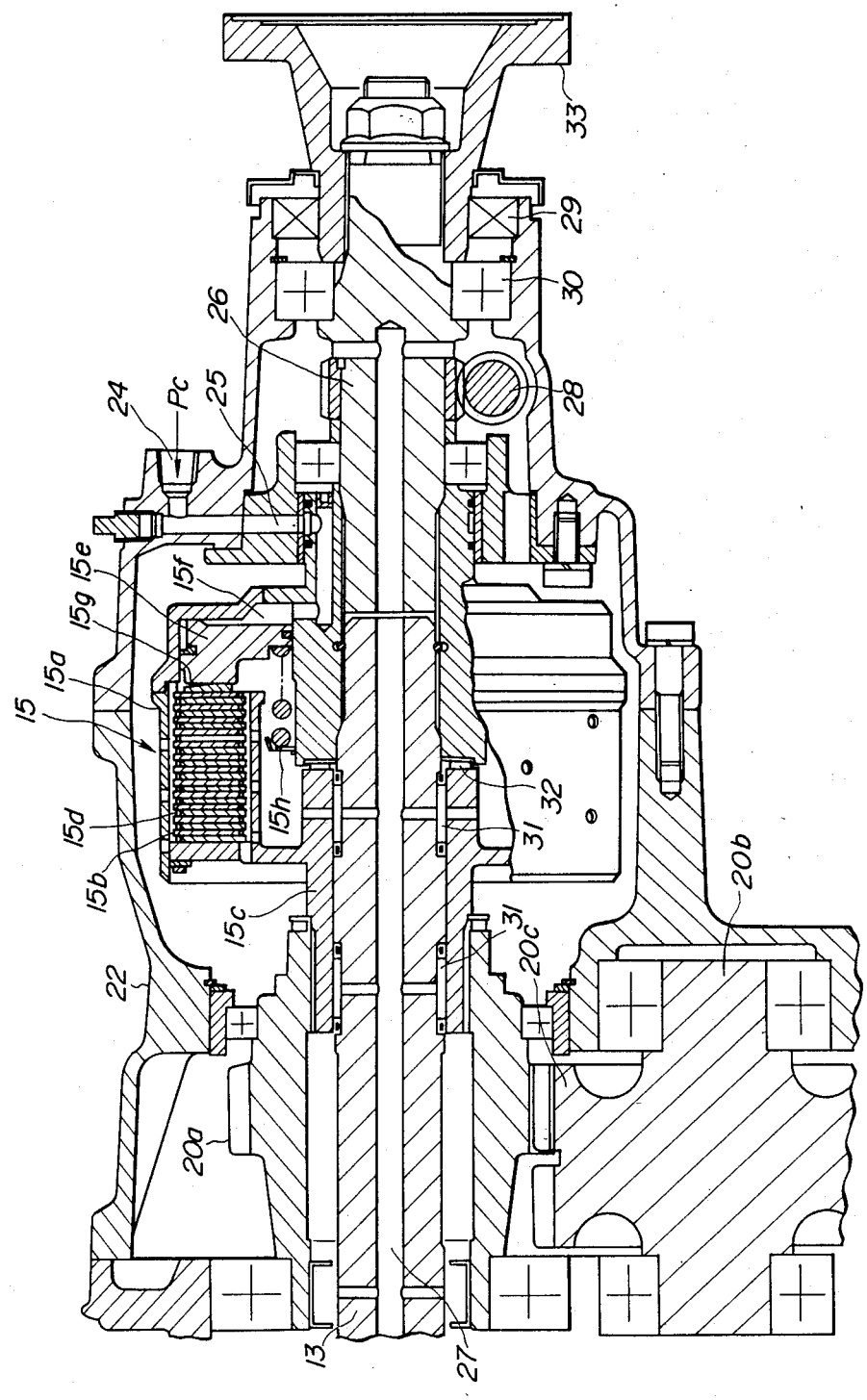
FIG. 3 is a sectional view of a transfer shown in FIG. 2.

FIG. 3 shows the transfer 10 of this embodiment more in detail. The transfer clutch 15, and various gears and shafts are enclosed in a transfer housing 22.

As shown in FIG. 3, the transfer clutch 15 includes a clutch drum 15a fixed to the transfer input shaft 13 and the rear wheel drive shaft 14, a plurality of friction plates 15b, a clutch hub 15c, a plurality of friction discs 15d, a clutch piston 15e, and a cylinder chamber 15f. The friction plates 15b are engaged with the clutch drum 15a so that the friction plates 15b rotate with the clutch drum 15a. The clutch hub 15c is rotatably mounted on the transfer input shaft 13. The friction discs 15d are engaged with the clutch hub 15c so that the friction discs 15d rotate with the clutch hub 15c. The clutch piston 15e is provided at one end of an alternating series of the friction plates 15b and the friction discs 15d. The cylinder chamber 15f is formed between the clutch piston 15e and the clutch drum 15a.

The gear train 20 has a first gear 20a provided on the clutch hub 15c, and a second gear 20c provided on an intermediate shaft 20b, which is engaged with a gear provided on the front wheel drive shaft 21. When the transfer clutch 15 is engaged, the driving force of the engine 11 is transmitted through the transfer clutch 15, and further transmitted through the gear train 20 from the transfer clutch 15 to the front wheel drive shaft 21. The front drive shaft 21 is connected with the front wheels 19 through the front differential 18, so that the driving force is transmitted to the left and right front wheels 19 through the transfer clutch 15.

The transfer clutch 15 further includes a dish plate 15g and a return spring 15h. In the transfer 10, there are further provided a clutch oil inlet port 24, a clutch oil passage 25, a rear output shaft 26, a lubricating oil passage 27, a speedometer pinion 28, an oil seal 29, a bearing 30, needle bearings 31, a thrust bearing 32, and a coupling flange 33. In this example, the transfer input shaft 13 and the rear wheel drive shaft 14 are connected through the rear output shaft 26.

As shown in FIG. 2, the driving force distribution control system D of this embodiment includes a pressure source 50 for producing an oil pressure to engage the transfer clutch 15, and a pressure control device 40 for producing a clutch oil pressure P by controlling the oil pressure produced by the pressure source 50.

The pressure control device 40 includes an electromagnetic proportional relief valve 46 for serving as an actuator of the control system.

The transfer 10, the pressure source 50 and the relief valve 46 are explained in U.S.P 4,773,500 and U.S.P 4,754,834 which are both listed in the first page of this application. The explanations of these documents are herein incorporated by reference.

The driving force distribution control system of this embodiment further includes a rear wheel speed sensor 41, a front left wheel speed sensor 42, a front right wheel speed sensor 43, and a control unit 45 for producing a control current signal (i) which is sent to the relief valve 46.

The front and rear wheel rotational speeds can be sensed at various positions in the drive system by using various types of sensors. The rear wheel speed sensor 41 of this embodiment is disposed at or near the rear wheel drive shaft 14, and arranged to sense a rotational speed of the rear wheels 17 and produce a rear wheel rotational speed signal (nr). The front left and right wheel speed sensors 42 and 43 are, respectively, disposed at or near the left and right front wheels 19, and arranged to sense rotational speeds of the left and right front wheels 19. The front left wheel speed sensor 42 produces a front left wheel speed signal ($wf_1$) representing the front left wheel rotational speed, and the front right wheel speed sensor 43 produces a front right wheel speed signal ($wf_2$) representing the front right wheel rotational speed. For example, each wheel speed sensor is composed of a sensor rotor fixed to a rotating member whose rotational speed is to be measured, and a pickup disposed near the sensor rotor for detecting change in magnetic force.

Figure 4:
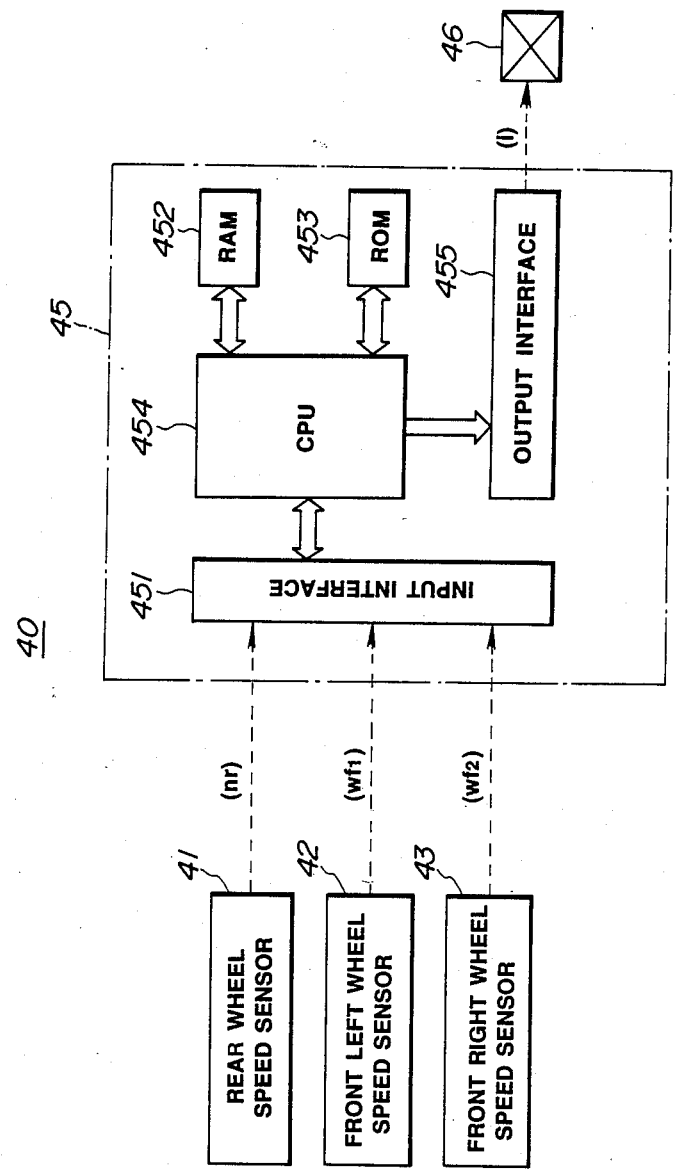
FIG. 4 is a block diagram showing a control unit of the control system shown in FIG. 2.
Figure 5:
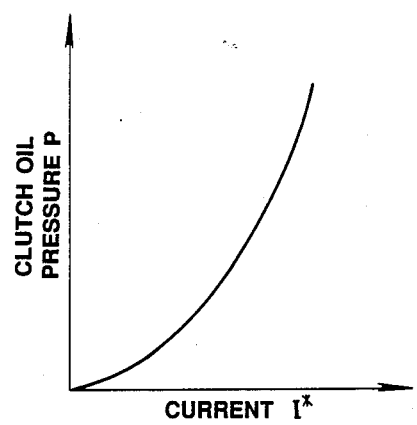
FIG. 5 is a graph showing a realationship between a clutch oil pressure and a magnitude of a control current signal, in the control system shown in FIG. 2.
Figure 6:
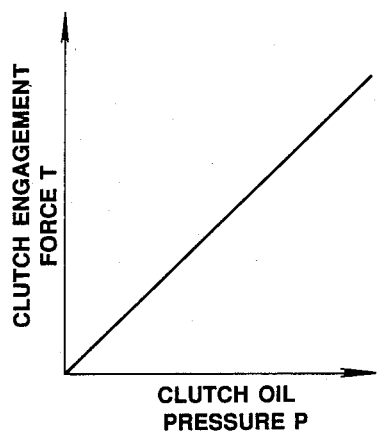
FIG. 6 is a graph showing a relationship between the clutch engagement force and the clutch oil pressure, in the control system shown in FIG. 2.

In this embodiment, a main component of the control unit 45 is a microcomputer mounted on the vehicle. As shown in FIG. 4, the control unit 45 of this embodiment includes an input interface section 451, a RAM section 452, a ROM section 453, a CPU 454 and an output interface section 455. The control unit 45 sends the current control signal (i) to the electromagnetic relief valve 46. When a current value I* of the current control signal (i) is equal to zero, then the relief valve 46 holds the clutch pressure P equal to zero. When the current value I* of the control signal (i) is greater than zero, the relief valve 46 produces the clutch pressure P corresponding to the current value I* as shown in FIG. 5, by controlling the drain oil flow of the line pressure from the pressure source 50. The clutch pressure P is supplied to the transfer clutch 15, and a clutch engagement force T is produced in accordance with the clutch oil pressure, as shown in FIG. 6. A relationship between the clutch oil pressure P and the clutch engagement force T is expressed as;

$$P = T/(\mu \cdot S \cdot 2n \cdot Rm)$$

where $\mu$ is a friction coefficient between the friction plates and discs, S is an area of the piston on which the pressure is applied, n is the number of the friction discs, and Rm is a radius effective for torque transmission, of the friction discs. The clutch engagement force T is increased substantially in proportion to the clutch oil pressure P.

Figure 7:
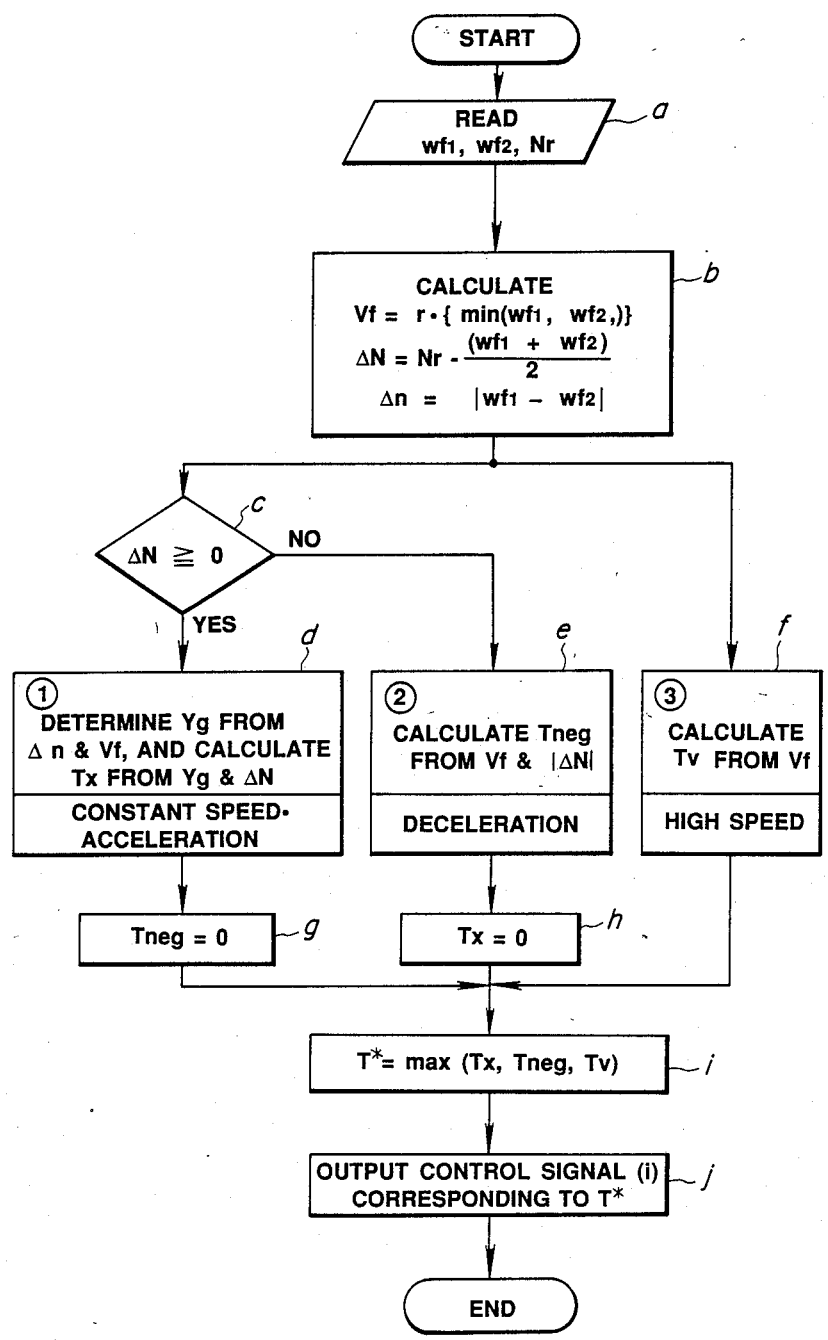
FIG. 7 is a flowchart showing a driving force distribution control process performed by the control unit shown in FIGS. 2 and 4.

FIG. 7 shows a control process performed by the control unit 45 of this embodiment.

At a first step a, the CPU 454 reads the front left wheel rotational speed $wf_1$, the front right rotational speed $wf_2$ and the rear wheel rotational speed Nr, which are sensed by the sensors 42, 43 and 41.

At a next step b, the CPU 454 calculates a vehicle speed Vf, a front and rear wheel speed difference Delta N, and a left and right front wheel speed difference Delta n.

In this embodiment, the vehicle speed Vf is calculated by using the following equation $$Vf = r \cdot \min(wf_1, wf_2)$$

In this equation, r is a tire radius, and $\min(wf_1, wf_2)$ is the smaller of the left and right front wheel rotational speeds $wf_1$ and $wf_2$. The quantity $\min(wf_1, wf_2)$ is equal to $wf_1$ when $wf_1$ is equal to or smaller than $wf_2$, and equal to $wf_2$ when $wf_2$ is smaller than $wf_1$. It is possible to determine the vehicle speed Vf by calculating the average value of the left and right front wheel speed $wf_1$ and $wf_2$, or by using a sensor capable of sensing the absolute ground speed, or by some other way.

The front and rear wheel rotational speed difference Delta N is calculated by using the following equation.

$$\Delta N = Nr - \{wf_1 + wf_2)/2\}$$

That is, the front and rear wheel speed difference Delta N is a difference resulting from subtraction of the front wheel rotational speed from the rear wheel rotational speed. In this embodiment, the front wheel rotational speed is the average of the left and right front wheel speeds $wf_1$ and $wf_2$ sensed by the front wheel speed sensors 42 and 43, and the rear wheel speed Nr is sensed by the rear wheel speed sensor 41. Alternatively, it is possible to determine the front and rear wheel speed difference by directly sensing a difference between rotational speeds of two members, one rotating with the front wheels, and the other rotating with the rear wheels.

The left and right front wheel rotational speed difference Delta n is calculated by using the following equation.

$$\Delta n = |wf_1 - wf_2|$$

That is, the left and right front wheel speed difference Delta n of this embodiment is the absolute value of the difference between the left and right front wheel speeds $wf_1$ and $wf_2$. The left and right front wheel speed difference Delta n is used for determining a turning radius R of the vehicle, and a lateral acceleration Yg. It is possible to determine the turning radius R by a steering angle such as a steering wheel angle, and to determine the lateral acceleration Yg by using a lateral acceleration sensor for directly sensing the lateral acceleration Yg, instead of calculating the left and right front wheel speed difference.

After the step b, the CPU 454 proceeds to a first program segment consisting of steps c, d, e, g and h, and a second program segment consisting of a step f. The first and second program segments are performed in parallel.

In the first segment, the CPU 454 first determines, at the step c, whether the front and rear wheel speed difference Delta N is equal to or greater than zero, or not. If Delta N is equal to or greater than zero, then the CPU 454 proceeds to the step d which is designed for control during a constant speed operation and control during acceleration. If Delta N is negative, then the CPU 454 proceeds to the step e which is designed for control during deceleration. At the steps d and e, the transfer clutch engagement force is calculated mainly in accordance with the front and rear wheel speed difference Delta N. At the step d, the CPU 454 calculates the lateral acceleration Yg from the left and right front wheel speed difference Delta n and the vehicle speed Vf, and further calculates a first clutch engagement force Tx from the lateral acceleration Yg and the front and rear wheel speed difference Delta N. At the step e, the CPU 454 calculates a second clutch engagement force Tneg from the vehicle speed Vf and the front and rear wheel speed difference Delta N.

On the other hand, the step f is designed for control during a high speed operation. The CPU 454 calculates a third transfer clutch engagement force Tv from the vehicle speed Vf. The third clutch engagement force is a quantity which is dependent only on the vehicle speed Vf.

After the calculation of Tx at the step d, the CPU 454 sets Tneg equal to zero at the step g. After determining Tneg at the step e, the CPU 454 sets Tx equal to zero at the step h.

At a step i, the CPU 454 determines a desired clutch engagement force T* by selecting the greatest of Tx, Tneg and Tv. That is;

$$T^* = \max(Tx, Tneg, Tv)$$

The desired clutch engagement force T* is equal to Tx when TX is the greatest of the three, equal to Tneg when Tneg is the greatest, and equal to Tv when Tv is the greatest.

At a step j, the CPU 454 sends the clutch pressure control signal (i) corresponding to the desired clutch engagement force T*, to the electromagnetic proportional relief valve 46. Therefore, the transfer clutch 15 is engaged with the force equal to the desired clutch engagement force T*.

Figure 8:
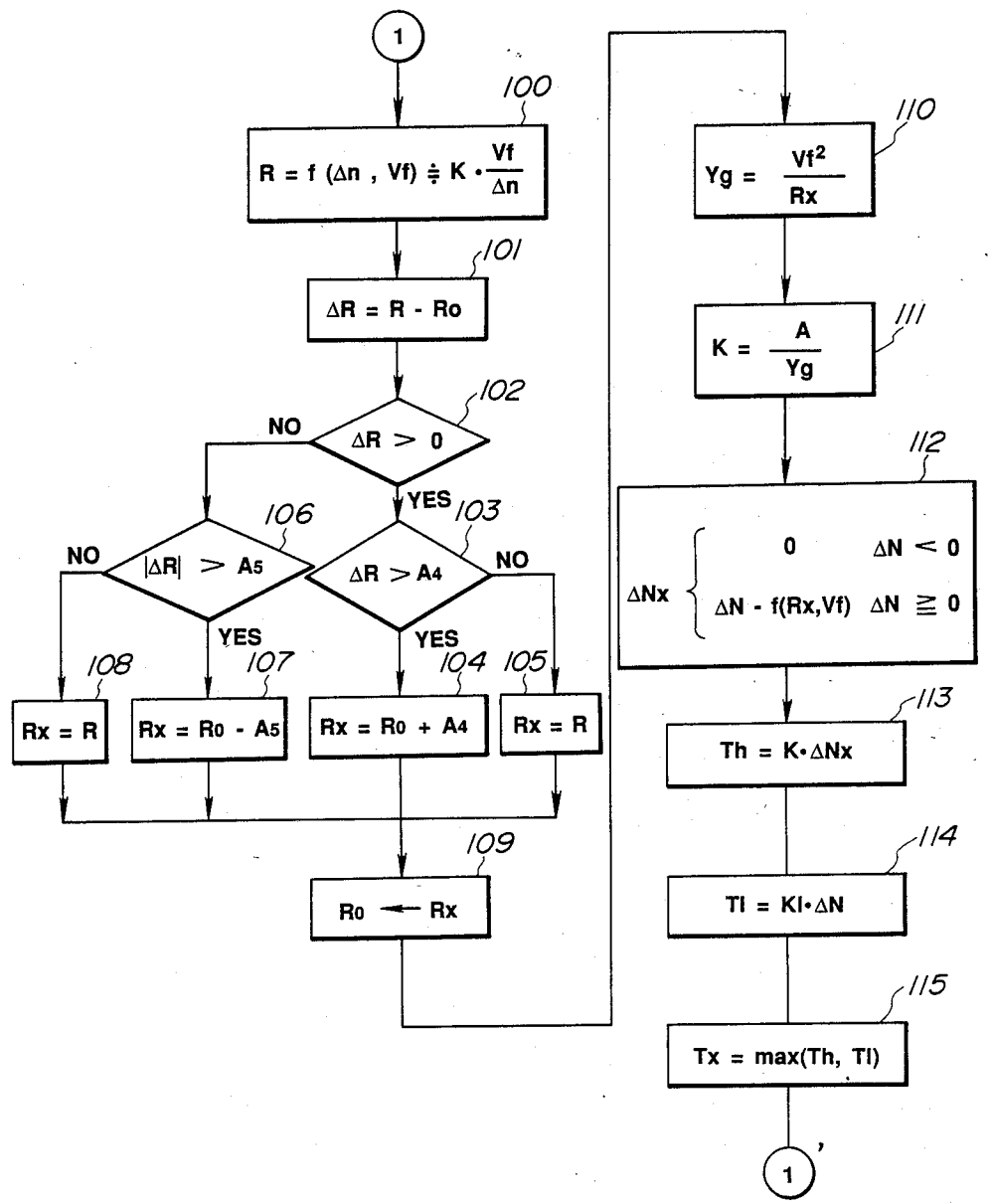
FIG. 8 is a flowchart showing a program section of the program of FIG. 7, which is designed for control during a constant speed operation and during acceleration.

FIG. 8 shows the process performed at the step d. (A similar process is disclosed in Japanese Pat. Application No. 62-36036.)

At a step 100, the CPU 454 calculates the turning radius R by using the left and right front wheel speed difference Delta n and the vehicle speed Vf obtained at the step b. The following equation is used;

$$R = f(\Delta n, Vf) \approx K \cdot Vf / \Delta n$$

At steps 101-109, the CPU 454 limits the rate of change (increase or decrease) of the turning radius R. With the steps 101 14 109, the CPU 454 performs a function similar to the function of a low pass filter.

At the step 101, the CPU 454 determines a variation Delta R of the turning radius R per unit time by subtracting the old value $R_0$ of the turning radius which was determined one cycle ago in the previous execution cycle, from the current value R of the turning radius which has been determined at the step 100 in the current execution cycle. The variation Delta R is the amount of change in the turning radius R during the predetermined unit time.

At the step 102, the CPU 454 determines whether the variation Delta R is greater than zero or not.

If the turning radius R is increasing, and accordingly, the variation Delta R is positive, then the CPU 454 proceeds to the step 103, at which it is determined whether the variation Delta R is greater than a predetermined variation value $A_4$. The value $A_4$ is the limit value beyond which the variation Delta R is not allowed to increase when the turning radius R is increasing.

If the variation Delta R is greater than $A_4$, then the CPU 454 proceeds from the step 103 to the step 104, at which the CPU 454 determines a modified turning radius Rx by adding the old turning radius value $R_0$ and the limit value $A_4$ ($Rx = R_0 + A_4$) If the variation Delta R is equal to or smaller than $A_4$, then the CPU 454 proceeds from the step 103 to the step 105, at which the modified turning radius Rx is set equal to the current turning radius value R ($Rx = R$).

When the turning radius R is decreasing, and the variation Delta R is negative, then the CPU 454 proceeds from the step 102 to the step 106. At the step 106, the CPU 454 determines whether the absolute value of the variation Delta R is greater than a predetermined variation value $A_5$. The predetermined value $A_5$ is greater than the predetermined value $A_4$.

If the absolute value |Delta R| of the turning radius variation is greater than $A_5$, then the CPU 454 proceeds from the step 106 to the step 107, at which the CPU sets the modified turning radius Rx equal to a difference resulting from subtraction of $A_5$ from the old turning radius value $R_0$. That is, $Rx = R_0 - A_5$.

If the absolute value of the turning radius variation is equal to or smaller than $A_5$, then the CPU 454 proceeds from the step 106 to the step 108, at which the modified turning radius Rx is set equal to the current turning radius value R ($Rx = R$).

At the step 109, the CPU 454 stores the modified turning radius Rx determined in the current execution cycle as the old turning radius value $R_0$.

At a step 110, the CPU 454 calculates the lateral acceleration Yg from the modified turning radius Rx and the vehicle speed Vf by using the following equation.

$$Yg = Vf^2 / Rx$$

At a step 111, the CPU 454 calculates a proportional coefficient (gain) K from the lateral acceleration Yg by using the following equation.

$$K = A/Yg$$

In this equation, A is a predetermined constant.

At a step 112, the CPU 454 determines a modified front and rear wheel speed difference Delta Nx. If the front and rear wheel speed difference Delta N is smaller than zero, then the modified front and rear wheel speed difference Delta Nx is set equal to zero (Delta Nx = 0). In this case, it is considered that the vehicle is negotiating a tight corner. If the front and rear wheel speed difference Delta N is equal to or greater than zero, then the CPU 454 sets the modified front and rear wheel speed difference Delta Nx equal to a from Delta N. That is;

$$\Delta Nx = \Delta N - f(Rx, Vf)$$

In this equation, f(Rx, Vf) is a front and rear wheel speed difference due to a difference in turning radius between the front and rear wheels, and a function of the turning radius and the vehicle speed. (The function f(Rx, Vf) is explained in U.S.P 4,776,424. The explanation in this document is herein incorporated by reference.) In this way, the control system of this embodiment is arranged to eliminate influence of the turning path on the front and rear wheel speed difference by subtracting f(Rx, Vf) from Delta N.

At a step 113, the CPU 454 determines a clutch engagement force Th by multiplying the modified front and rear wheel speed difference Delta Nx determined at the step 112, by the proportional gain K determined at the step 111. That is;

$$Th = K \cdot \Delta Nx$$

At a step 114, the CPU 454 determines a clutch engagement force T1 by multiplying the front predetermined proportionality constant Kl.

$$Tl = Kl \cdot \Delta N$$

At a step 115, the CPU 454 determines the first clutch engagement force Tx by selecting the greater of Th and Tl.

$$T_x = \max(T_h, T_l)$$

Therefore, the first clutch engagement force $T_x$ is equal to $T_h$ determined at the step 113 when the $T_h$ is equal to or greater than $T_l$, and $T_x$ is equal to $T_l$ determined at the step 114 when $T_h$ is smaller than $T_l$.

In this example, the clutch engagement force $T_h$ is determined by using the proporuality gain K which is indirectly filtered by filtering the turning radius R at the steps 104 and 107. The clutch engagement force $T_l$ is used for preventing the actual clutch engagement force from becoming excessively low. The control system of this example is arranged to provide the clutch engagement force $T_l$ at least.

Figure 9:
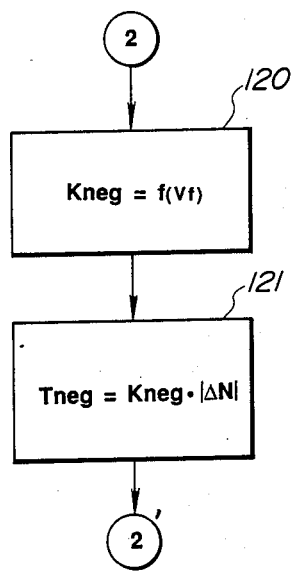
FIG. 9 is a flowchart showing a program section of the program of FIG. 7, which is designed for control during deceleration.

FIG. 9 shows the process performed at the step e of the flowchart of FIG. 7.

Figure 10:
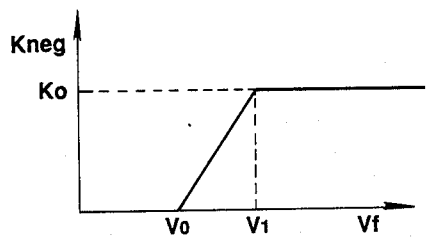
FIG. 10 is a graph showing a characteristic of a gain Kneg used in the program section of FIG. 9, with respect to the vehicle speed.
Figure 11:
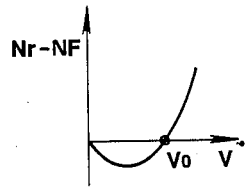
FIG. 11 is a graph showing a characteristic of the front and rear wheel speed difference with respect to the vehicle speed for illustrating a reference vehicle speed $V_0$ *shown in FIG. 10*.

At a step 120, the CPU 454 determines a gain Kneg in accordance with the vehicle speed $V_f$. The gain Kneg is a function of the vehicle speed $V_f$, as shown in FIG. 10. A reference vehicle speed value $V_0$ shown in FIG. 10 is a vehicle speed value at which the front and rear wheel speed difference Delta N turns from negative to positive as shown in FIG. 11. The gain Kneg is held equal to zero when the vehicle speed $V_f$ is lower than the reference vehicle speed $V_0$. The gain Kneg increases gradually from zero to an upper limit value $K_0$ as the vehicle speed $V_f$ increases from $V_0$ to a predetermined first vehicle speed value $V_1$. The gain Kneg is held equal to $K_0$ when the vehicle speed $V_f$ is higher than $V_1$.

At a step 121, the CPU 454 determines the second clutch engagement force Tneg from the gain Kneg obtained at the step 120 and the absolute value $|\Delta N|$ of the front and rear wheel speed difference by using the following equation.

$$T_{neg} = K_{neg} \cdot |\Delta N|$$

Figure 12:
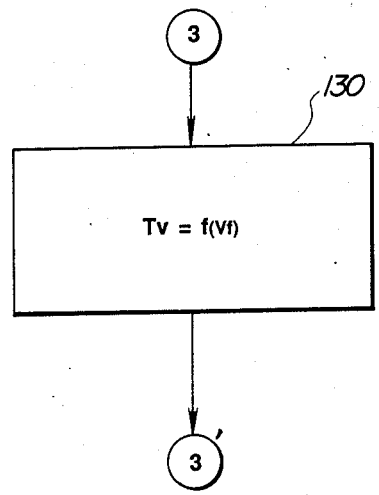
FIG. 12 is a flowchart showing a program section of the program of FIG. 7, which is designed for control at high vehicle speeds.

FIG. 12 shows the process performed at the step f of the flowchart of FIG. 7.

At a step 130, the CPU 454 determines the third clutch engagement force $T_v$ which is a function dependent only on the vehicle speed $V_f$.

$$T_v = f(V_f)$$

Figure 13:
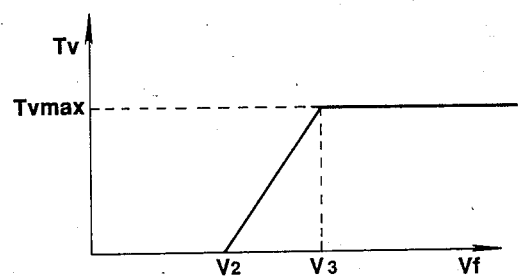
FIG. 13 is a graph showing a characteristic of the clutch engagement force versus the vehicle speed, used in the program section of FIG. 12.

This vehicle speed dependent function $f(V_f)$ is shown in FIG. 13. As shown in FIG. 13, the third clutch engagement force $T_v$ is held equal to zero when the vehicle speed $V_f$ is lower than a predetermined second vehicle speed value $V_2$, and increases gradually from zero to a maximum clutch engagement force value Tvmax as the vehicle speed $V_f$ increases from $V_2$ to a predetermined third vehicle speed value $V_3$. In this way, the control process of FIG. 12 is designed to increase the transfer clutch engagement force in accordance with the vehicle speed. The principal object of this control process is to increase the vehicle stability at high speeds. Therefore, the second and third vehicle speed values $V_2$ and $V_3$ are set equal to sufficiently high values so as not to exert influences on the turning ability of the vehicle at low and medium vehicle speeds. For example, the second vehicle speed value $V_2$ is approximately equal to 80 km/h, and the third vehicle speed value $V_3$ is approximately equal to 120 km/h. The maximum clutch engagement force value Tvmax is set to such a value that the control system can ensure the stability in a high speed straight ahead operation, and make the vehicle weak understeering in a turning operation with acceleration.

The control system of this embodiment controls the driving force distribution as follows:

(A) In low and medium speed operations with constant speed or acceleration:

When the vehicle speed is in the low and medium range below 80 km/h, for example, and the vehicle speed is held constant or being increased, then the control unit 45 reduces the vehicle speed dependent clutch engagement force $T_v$ almost to zero, and selects the first clutch engagement force $T_x$ as the desired clutch engagement force $T^*$. Therefore, the control system can provide satisfactory turning performance.

(B) During deceleration:

During deceleration, the control unit 45 selects the second clutch engagement force Tneg as the desired clutch engagement force $T^*$ as long as the vehicle speed is not high. Therefore, the control system can increase the stability during deceleration, as explained in the U.S. Pat. Application based on Japanese Application No. 62259037.

(C) At high speeds:

In a high speed operation in which the vehicle speed is higher than $V_2$, for example 80 km/h, the control unit 45 selects the greater of the first clutch engagement force $T_x$ and the third clutch engagement force $T_v$ as the desired clutch engagement force $T^*$. Therefore, when the vehicle speed $V_f$ is high, the vehicle speed dependent clutch engagement force $T_v$ is selected as the desired value $T^*$ even if the front and rear wheel speed difference Delta N is still small. In a high speed straight ahead operation, therefore, the control system increases the clutch engagement of the transfer clutch 15 in accordance with the vehicle speed $V_f$ before the front and rear wheel speed difference Delta N appears. Thus, the control system of this embodiment can improve the stability in lane change operations, and the stability against minute disturbances. When the vehicle is accelerated during a turn at high speeds, the control system of this embodiment provides a weak understeer characteristic with low sensitivity in yawing motion by selecting the vehicle speed dependent clutch engagement force, so that the driver can easily maneuver the vehicle even at high speeds.

In this way, the control system of the embodiment can satisfy both the requirements during acceleration and deceleration in the low and medium speed range and the requirements in the high speed range by selecting the greater of the speed difference dependent clutch engagement force $T_x$ or Tneg and the vehicle speed dependent clutch engagement force $T_v$. The first clutch engagement force $T_x$ is so determined as to provide optimum performance in a turn at low and medium speeds. The second clutch engagement force Tneg is so determined as to improve the stability during deceleration. The third clutch engagement force $T_v$ is so determined as to improve the stability at high speeds. Among these values obtained by different calculations, the most influential value is selected, so that the control system can always provide a stable performance.

The clutch oil pressure can be controlled in various manners. For example, it is possible to employ a duty factor control system using a solenoid valve which opens and closes a fluid passage in response to a periodic pulse signal. It is optional to use an electromagnetic clutch, or a clutch utilizing the viscosity of a fluid or some other clutch in place of the multiple disc friction transfer clutch of the illustrated embodiment.

What is claimed is:

1. A driving force distribution control system for a vehicle, comprising:

clutch means provided in a drive system of the vehicle for varying a driving force transmitted therethrough to vary a driving force distribution between front and rear wheels in response to a control signal, sensing means comprising first detecting means for determining a front and rear wheel speed difference, and second detecting means for determining a vehicle speed, and controlling means for controlling a clutch engagement force of said clutch means to control the driving force distribution by producing said control signal, said controlling means comprising first calculating means for determining a first clutch engagement force in accordance with said front and rear wheel speed difference, second calculating means for determining a second clutch engagement force in accordance with only said vehicle speed, and selecting means for determining a desired clutch engagement force which is equal to said first engagement force when said first force is equal to or greater than said second force, and which is equal to said second engagement force when said second force is greater than said first force.

2. A control system according to claim 1 wherein said second calculating means is arranged to hold said second engagement force equal to a minimum force value when said vehicle speed is lower than a predetermined first vehicle speed value.

3. A control system according to claim 2 wherein said minimum force value is approximately equal to zero.

4. A control system according to claim 2 wherein said first calculating means increases said first engagement force as an absolute value of said front and rear wheel speed difference increases, and said second calculating means increases said second engagement force as said vehicle speed increases.

5. A control system according to claim 4 wherein said clutch means comprises a transfer clutch provided in a drive path for transmitting a driving torque to the front wheels, and arranged to vary the driving force transmitted to the front wheels by varying said clutch engagement force.

6. A control system according to claim 5 wherein said second calculating means increases said second clutch engagement force gradually from said minimum force value to a predetermined maximum force value as said vehicle speed increases from said first vehicle speed value to a predetermined second vehicle speed value, and holds said second engagement force equal to said maximum force value when said vehicle speed is higher than said second vehicle speed value.

7. A control system according to claim 6 wherein said sensing means further comprises third detecting means for determining a lateral acceleration of the vehicle, and said first calculating means comprises comparing means for receiving said front and rear wheel speed difference which is a difference resulting from subtraction of a front wheel speed from a rear wheel speed, and determining whether said front and rear wheel speed difference is equal to or greater than zero, first operating means for determining said first clutch engagement force in accordance with said lateral acceleration and said front and rear wheel speed difference when said front and rear wheel speed difference is equal to or greater than zero, and second operating means for determining said first engagement force in accordance with said vehicle speed and said front and rear wheel speed difference when said front and rear wheel speed difference is smaller than zero.

8. A control system according to claim 7 wherein said first operating means increases said first engagement force as said front and rear wheel speed difference increases, and decreases said first engagement force as said lateral acceleration increases.

9. A control system according to claim 8 wherein said second operating means determines said first engagement force so that said first engagement force is equal to a product obtained by multiplying an absolute value of said front and rear wheel speed difference by a gain which is zero when said vehicle speed is lower than a predetermined reference vehicle speed value, which increases gradually from zero to a maximum gain value as said vehicle speed increases from said reference vehicle speed value to a predetermined upper vehicle speed value, and which is held equal to said maximum gain value when said vehicle speed is higher than said upper vehicle speed value.

10. A control system according to claim 9 wherein said sensing means comprises a rear wheel speed sensor for sensing said rear wheel speed, a front left wheel speed sensor for sensing a front left wheel speed, and a front right wheel speed sensor for sensing a front right wheel speed.

* * * * *